United States Patent [19]

Nam et al.

[11] Patent Number: 5,527,565
[45] Date of Patent: Jun. 18, 1996

[54] METHOD OF MANUFACTURING A RADIATION SENSOR ELEMENT

[76] Inventors: Leong T. Nam, 114 6th Avenue, Bez Valley, Johannesburg; Rex J. Keddy, 3 Bevan Road, Rivonia, Sandton; Johan F. Prins, 8 Portland Place, Northcliff Extension 15 Johannesburg, all of South Africa

[21] Appl. No.: 289,527

[22] Filed: Aug. 12, 1994

[30] Foreign Application Priority Data

Aug. 12, 1993 [ZA] South Africa ............................. 93/5877

[51] Int. Cl.⁶ ................................. B05D 3/06; G01J 1/00
[52] U.S. Cl. .......................... 427/535; 427/551; 427/523; 427/249; 250/370.01; 423/446
[58] Field of Search ..................... 427/249, 577, 427/535, 551, 523; 250/370.01; 423/446; 117/929

[56] References Cited

U.S. PATENT DOCUMENTS

| | | | |
|---|---|---|---|
| 3,824,680 | 7/1974 | Kozlov et al. | |
| 4,045,674 | 8/1977 | Vermeulen | |
| 4,465,932 | 8/1984 | Burgemeister | |
| 4,833,328 | 5/1989 | Prins et al. | 250/370.01 |
| 4,957,591 | 9/1990 | Sato et al. | 127/535 |
| 5,055,686 | 10/1991 | Jones | |
| 5,079,425 | 1/1992 | Imai et al. | 250/370.01 |
| 5,097,133 | 3/1992 | Nam et al. | 250/370.01 |
| 5,128,546 | 7/1992 | Nam et al. | |
| 5,216,249 | 6/1993 | Jones et al. | 250/484.3 |
| 5,399,868 | 3/1995 | Jones et al. | 250/484.2 |

FOREIGN PATENT DOCUMENTS 0479625  4/1992  European Pat. Off.

*Primary Examiner*—Roy V. King
*Attorney, Agent, or Firm*—Scully, Scott, Murphy & Presser

[57] ABSTRACT

A method of manufacturing a radiation sensor element. The method includes providing a diamond body which comprises crystalline diamond material which has a nitrogen impurity concentration of less than 150 ppm. The body is typically a synthetic diamond manufactured by a high temperature/high pressure process, or by a chemical vapour deposition process. The body is hydrogenated to cause atomic hydrogen to be incorporated into the diamond crystal lattice. Hydrogenation can be carried out by ion implantation, or by exposing the body to a hydrogen plasma. Where the sensor element is to be used as a counting diamond, electrical contacts are formed on the body, for example by ion implantation.

17 Claims, 2 Drawing Sheets

METHOD OF MANUFACTURING A RADIATION SENSOR ELEMENT

BACKGROUND OF THE INVENTION

This invention related to a method of manufacturing a sensor for detecting ionising radiation and to a diamond sensor element formed by the method.

It is known to use diamond material in manufacturing radiation sensors. The performance of such sensors is determined largely by the concentration of paramagnetic nitrogen, the main impurity in most such sensors. It has been shown that when the concentration of such nitrogen decreases to a relatively low value, a dramatic increase in sensitivity to radiation is observed. However, the usefulness of this increase in sensitivity is offset to some extent by an increase in the response time of the sensor, due to an increase in the shallow free-carrier trapping sites.

SUMMARY OF THE INVENTION

According to the invention a method of manufacturing a radiation sensor element comprises the steps of:

providing a diamond body comprising crystalline diamond material having a nitrogen impurity concentration as determined by Electron Spin Resonance (ESR) techniques of 150 ppm or less; and hydrogenating the body to cause atomic hydrogen to be incorporated into the diamond crystal lattice.

The diamond material preferably has a nitrogen impurity concentration of 60 ppm or less, and most preferably less than 10 ppm.

The diamond body will typically be selected as having the properties of a counting diamond or a diamond which is capable of exhibiting thermoluminescence when subjected to ionizing radiation.

The diamond body may comprise a synthetic diamond manufactured by a high temperature/high pressure process, or by a chemical vapor deposition (CVD) process.

Preferably, the diamond body is a single crystal diamond.

The diamond body may be hydrogenated by means of an ion implantation process.

In such a process, the ions may be implanted with an energy in the range 1 keV to 1 MeV, preferably 35 keV to 170 keV, and with an ion dose in the range $10^{16}$ ions/cm$^2$ to $10^{18}$ ions/cm$^2$.

During implantation, the diamond body is preferably maintained at a temperature in the range 50° C. to 300° C.

Alternatively, hydrogenation may be carried out by exposing the diamond body to a hydrogen plasma in a plasma enhance CVD process.

The method may further include the step of forming at least two spaced apart electrical contacts on the diamond body.

The contacts are preferably formed by implanting suitable ions into respective contact areas on the surface of the diamond body.

A particularly suitable ion for this purpose is carbon.

The invention extends to a radiation sensor element formed by the method, and to radiation detector apparatus including the sensor element in a probe.

DESCRIPTION OF EMBODIMENTS

Figure 1:
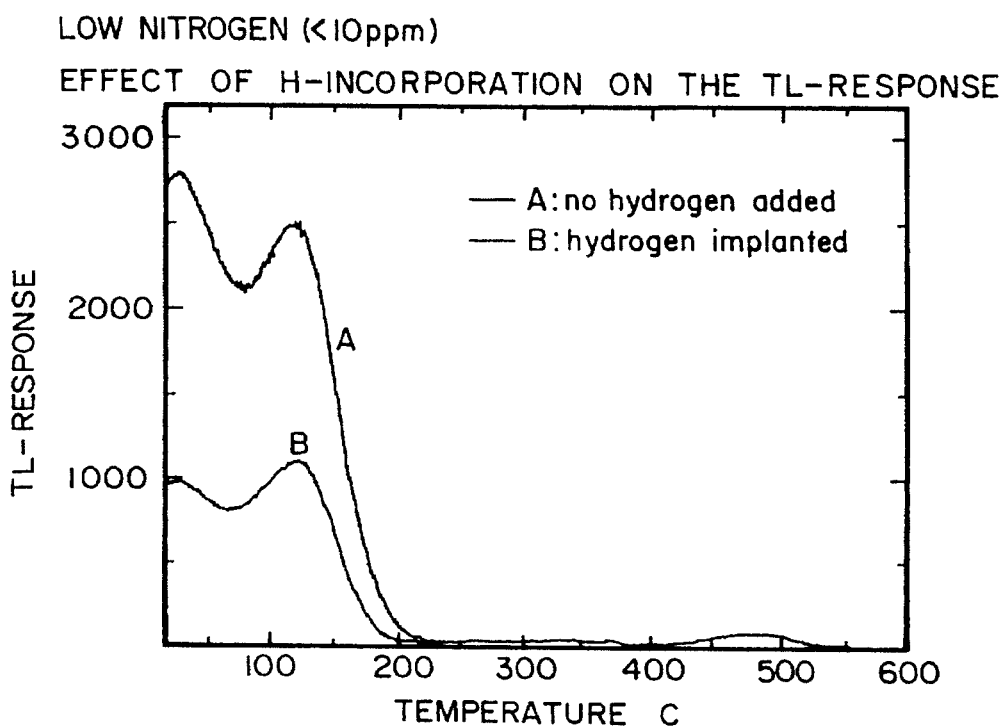
FIG. 1 is a graph showing the relationship between thermoluminescent response and temperature of a diamond having a nitrogen concentration of less than 10 ppm, before and after implantation with hydrogen.

The diamond body used in the radiation sensor element of the invention may be of the type synthesized under high pressure/high temperature conditions and described in U.S. Pat. No. 5,097,133. Alternatively, it may be synthesized under low pressure conditions according to a chemical vapour deposition process. Many such processes are well documented and include hot filament as well as RF or microwave plasma enhanced chemical vapor deposition (CVD). The diamond body may be a single crystal or a polycrystalline mass. The diamond should have a nitrogen impurity concentration as measured by electron spin resonance (ESR) techniques of 150 ppm or less, and preferably less than 60 ppm. Diamonds with nitrogen concentration of less than 10 ppm have been found to exhibit excellent sensitivity to ionising radiation and are highly suited to use as radiation detector elements. Typically, the diamond body will contain nitrogen on isolated substitutional lattice sites and be of type Ib according to the Robertson, Fox and Martin classification.

According to the invention, hydrogen atoms are incorporated into the diamond crystal lattice by various methods such as ion implantation or low power plasma treatment. The preferred conditions for ion implantation according to the invention are an ion energy in the range from 35 keV to 170 keV and ion doses from $5 \times 10^{16}$/cm$^2$ to $10^{12}$/cm$^2$. The ion energy could vary, however, between about 1 keV and 1 MeV (the practical limits imposed by conventional ion implantation equipment). The temperature of the diamond during implantation should preferably be maintained in the range from 50° C. to 300° C.

The resulting hydrogenated diamonds, although usable in a thermoluminescent (TL) mode as disclosed in U.S. Pat. No. 4,754,140, are preferably used as counting diamonds in conduction mode in the measurement of ionising radiation. See for example, U.S. Pat. No. 5,097,133. For use in conduction mode, the diamond is provided with suitable electrical contacts. The contacts can conveniently be applied to contact sites on opposed surfaces of the diamond body which are substantially parallel with each other.

The preferred contacts are of the type applied by ion implantation according to the teachings of U.S. Pat. No. 4,833,328, the preferred implanted ion being that of carbon. Alternatively, the diamond sensor body may be held in a clamp forming part of a probe assembly of the type described in South African Patent Application No. 93/1541.

EXAMPLE

Two sets of single-crystal diamonds of type Ib were prepared by high pressure/high temperature synthesis. The diamonds produced were each approximately 2 mm×2 mm in cross-section and 0.7 mm in thickness. The diamonds in the first set had paramagnetic nitrogen impurity concentrations, as determined by ESR, of about 60 ppm. The diamonds in the second set had nitrogen concentrations of less than 10 ppm. Each of the diamond specimens was polished to provide two opposite and substantially parallel surfaces. After polishing, the specimens were cleaned in an acid solution of 1 part $HNO_3$, 3 parts $HClO_4$ and 4 parts $H_2SO_4$. Ohmic electrical contacts were prepared on the specimens by implanting carbon ions into contact sites on the opposite parallel surfaces of each, as taught in U.S. Pat. No. 4,833,328.

Each of the specimen crystals was precharacterised by thermoluminescent performance as well as by conduction response by subjecting it to β irradiation from a $^{90}Sr\beta$ source and γ irradiation from a $^{60}Co$ source, respectively.

Thermoluminescence was measured using a TOLEDO-654 thermoluminescence reader coupled to a SPECTRUM-88 multichannel analyser, the diamonds being held vertically by the parallel implanted surfaces. Post irradiation TL response from each of the sides were then recorded on a personal computer for analysis.

For conduction measurements, the diamonds were in turn clamped in a probe of the type described in South African Patent Application No. 93/1541. The probe was coupled via a voltage matching interface to a PTW DI/4 dosimeter and ratemeter system and the response of each specimen to irradiation monitored.

After precharacterisation of the diamond specimens, the carbon implanted surfaces were removed by polishing. Hydrogen ions were then implanted under the following conditions:

The specimens were maintained at a temperature of 100° C. while hydrogen ($H^+$) ions with energy of 50 keV and a dose of $5\times10^{16}/cm^2$ were applied to the contact sites on the pairs of opposite and parallel surfaces. Following each hydrogen implantation regime, carbon ions were implanted on to the same surface to provide new ohmic contacts in the manner described above.

The diamonds were then reirradiated under identical conditions to those used previously and the TL and conduction mode responses measured as before for comparison with the prehydrogenation data generated earlier.

Figure 2:
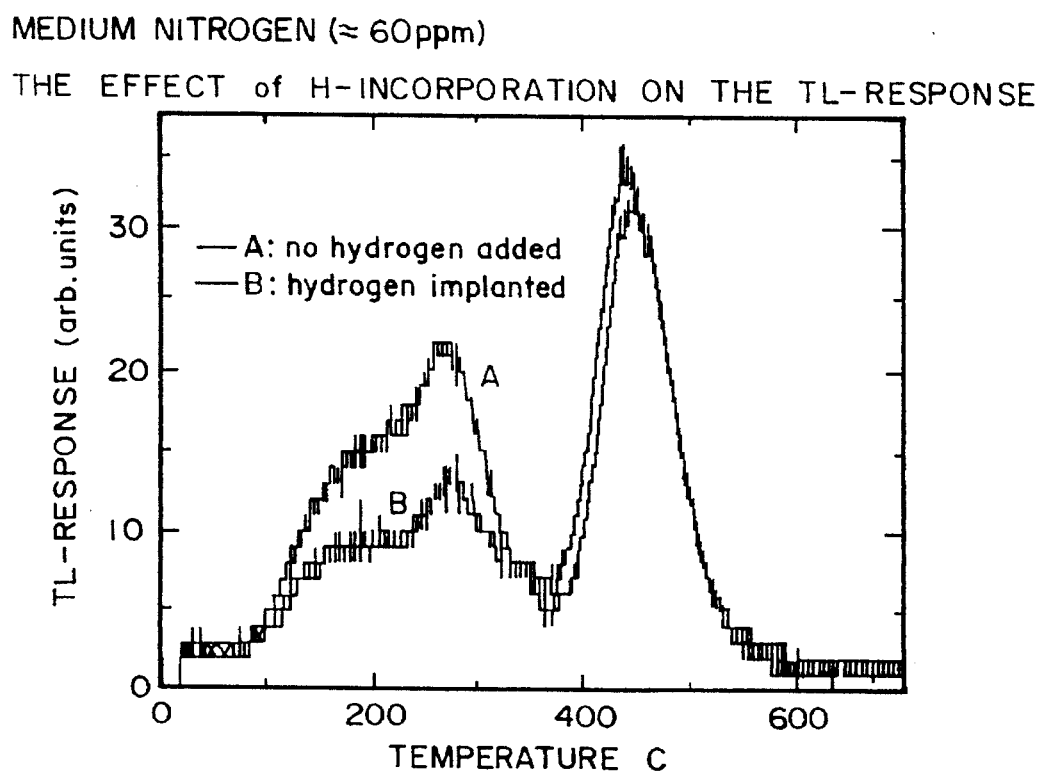
FIG. 2 is a graph showing the relationship between thermoluminescent response and temperature of a diamond having a nitrogen concentration of about 60 ppm, before and after implantation of hydrogen.

Glow curves were plotted for both sets of diamonds before and after implantation with $H^+$ ions. FIG. 1 shows the response for low nitrogen (<10 ppm) diamonds, and FIG. 2 for the higher nitrogen (60 ppm) counterparts, the higher readings recorded in FIG. 1 indicating a higher concentration of low energy trapping levels than are found in the diamonds of FIG. 2. The curves marked "A" are for the unhydrogenated diamonds. It is noticed from the curves marked "B" that this relative difference in the number of low energy trapping levels remained even after the hydrogenation treatment. The decrease in area under the glow curved after the implanting of hydrogen is thought to be due to a corresponding decrease in uncompensated trap concentrations in both groups of crystals.

Figure 3:
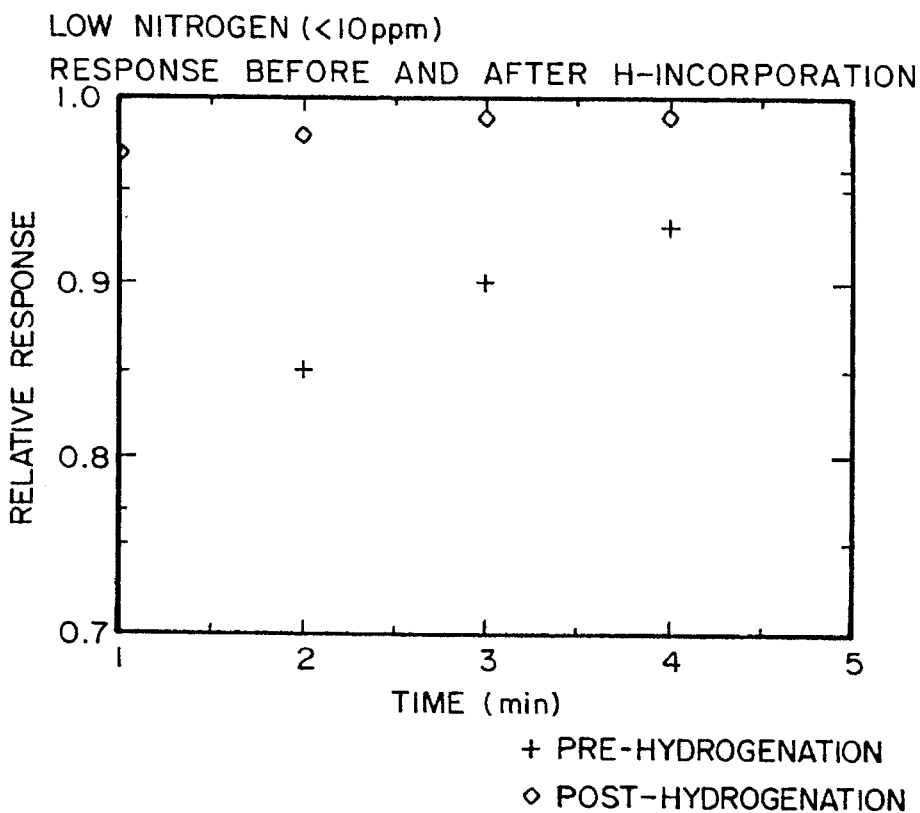
FIG. 3 is a graph comparing the response times of the low nitrogen diamond of FIG. 1 in conduction mode before and after hydrogenation.
Figure 4:
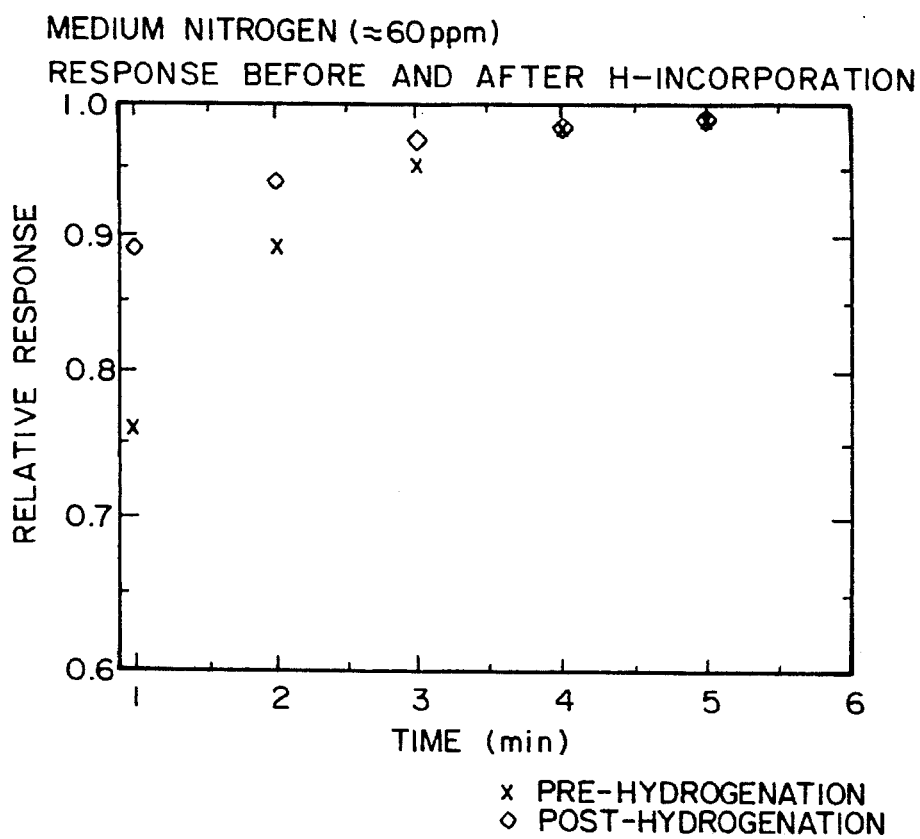
FIG. 4 is a graph comparing the response of the medium nitrogen diamond of FIG. 2 in conduction mode before and after hydrogenation.

FIGS. 3 and 4 indicate the radiation response of the low and higher nitrogen sets of diamonds respectively on conduction mode before and after hydrogenation. Although there was not change in the magnitude of the conduction response, the response time (or rise time) improved significantly after hydrogenation. This improvement and the previously observed drop in thermoluminescence after hydrogenation are ascribed to the passivation of trapping levels in the diamond crystal by the hydrogen.

The post synthesis hydrogenation treatment of this invention enables highly sensitive radiation detectors with good rise time response to be manufactured routinely. Furthermore, the diamond sensor elements may be subjected to a series of hydrogenation steps of the same or of different doses and energies, and the effect of each such step can be conveniently monitored by applying thermoluminescence techniques.

We claim:

1. A method of manufacturing a radiation sensor element comprising the steps of:

providing a diamond body comprising crystalline diamond material having a nitrogen impurity concentration as determined by Electron Spin Resonane (ESR) techniques of 150 ppm or less; and hydrogenating the diamond body to cause atomic hydrogen to be incorporated into the diamond crystal lattice.

2. A method according to claim 1 wherein the diamond material has a nitrogen impurity concentration of 60 ppm or less.

3. A method according to claim 2 wherein the diamond material has a nitrogen impurity concentration of less than 10 ppm.

4. A method according to claim 1 wherein the diamond body is a counting diamond.

5. A method according to claim 1 wherein the diamond body is thermoluminescent when subjected to ionizing radiation.

6. A method according to claim 1 wherein the diamond body comprises a synthetic diamond.

7. A method according to claim 1 wherein the diamond body comprises a synthetic diamond manufactured by a chemical vapor deposition (CVD) process.

8. A method according to claim 6 or claim 7 wherein the diamond body is a single crystal diamond.

9. A method according to claim 1 wherein the diamond body is hydrogenated by means of an ion implantation process.

10. A method according to claim 1 wherein said ion implantation is carried out with an energy in the range from 1 keV to 1 MeV.

11. A method according to claim 10 wherein said ion implantation is carried out with an energy in the range from 35 keV to 170 KeV.

12. A method according to claim 9 wherein said ion implantation is carried out with an ion dose in the range from $10^{16}$ ions/cm² to $10^{18}$ ions/cm².

13. A method according to claim 9 wherein the diamond body is maintained at a temperature in the range 50° C. to 300° C. during implantation thereof.

14. A method according to claim 1 wherein the diamond body is hydrogenated by exposing the diamond body to a hydrogen plasma.

15. A method according to claim 1 including the step of forming at least two spaced apart electrical contacts on the diamond body.

16. A method according to claim 15 wherein the contacts are formed by implanting ions which form electric contacts into spaced apart areas on the diamond body.

17. A method according to claim 16 wherein the ions are carbon ions.

* * * * *

UNITED STATES PATENT AND TRADEMARK OFFICE
CERTIFICATE OF CORRECTION

PATENT NO. : 5,527,565
DATED : June 18, 1996
INVENTOR(S) : Leong T. Nam, et al.

It is certified that error appears in the above-indentified patent and that said Letters Patent is hereby corrected as shown below:

Column 1, line 6: "related" should read --relates--

Column 2, line 40: "$10^{12}$" should read --$10^{18}$--

Column 3, line 7: "1" should read --$\lambda$--

Column 3, line 20: "response" should read --responses--

Column 4, line 16, Claim 1: "Resonane" should read --Resonance--

Signed and Sealed this

First Day of April, 1997

Attest:

BRUCE LEHMAN

*Attesting Officer*  Commissioner of Patents and Trademarks